United States Patent [19]

Gullickson

[11] Patent Number: 4,914,896

[45] Date of Patent: Apr. 10, 1990

[54] CROP BLOWER APPARATUS

[76] Inventor: M. Roy Gullickson, Box 70, Barons, Alberta, Canada, T0L 0G0

[21] Appl. No.: 279,124

[22] Filed: Dec. 2, 1988

[51] Int. Cl.⁴ .............................................. A01D 45/20
[52] U.S. Cl. ....................................... 56/12.9; 56/13.4
[58] Field of Search .................. 56/10.7, 12.8, 12.9, 56/13.1, 13.4, DIG. 8

[56] References Cited

U.S. PATENT DOCUMENTS

| | | |
|---|---|---|
| 1,900,269 | 3/1933 | Altgelt et al. |
| 2,502,810 | 4/1950 | Waters |
| 2,670,586 | 3/1954 | Phillips |
| 3,828,531 | 8/1974 | Quick ................................... 56/12.9 |
| 4,406,112 | 9/1988 | Brooks ................................. 56/12.9 |

FOREIGN PATENT DOCUMENTS 1580359 12/1980 United Kingdom ................. 56/12.9

Primary Examiner—William P. Neuder
Attorney, Agent, or Firm—Shlesinger & Myers

[57] ABSTRACT

A crop blower apparatus includes a blower for providing a stream of forced air. There is a mechanism for powering the blower and a discharge duct connected to the blower for providing a directed curtain of air and a frame for mounting the blower forwardly of the knife of a harvester. There may be a plurality of blowers having discharge ducts which are juxtaposed so as to discharge a substantially continuous curtain of air. The blowers may have coaxial drive shafts which are interconnected.

20 Claims, 5 Drawing Sheets

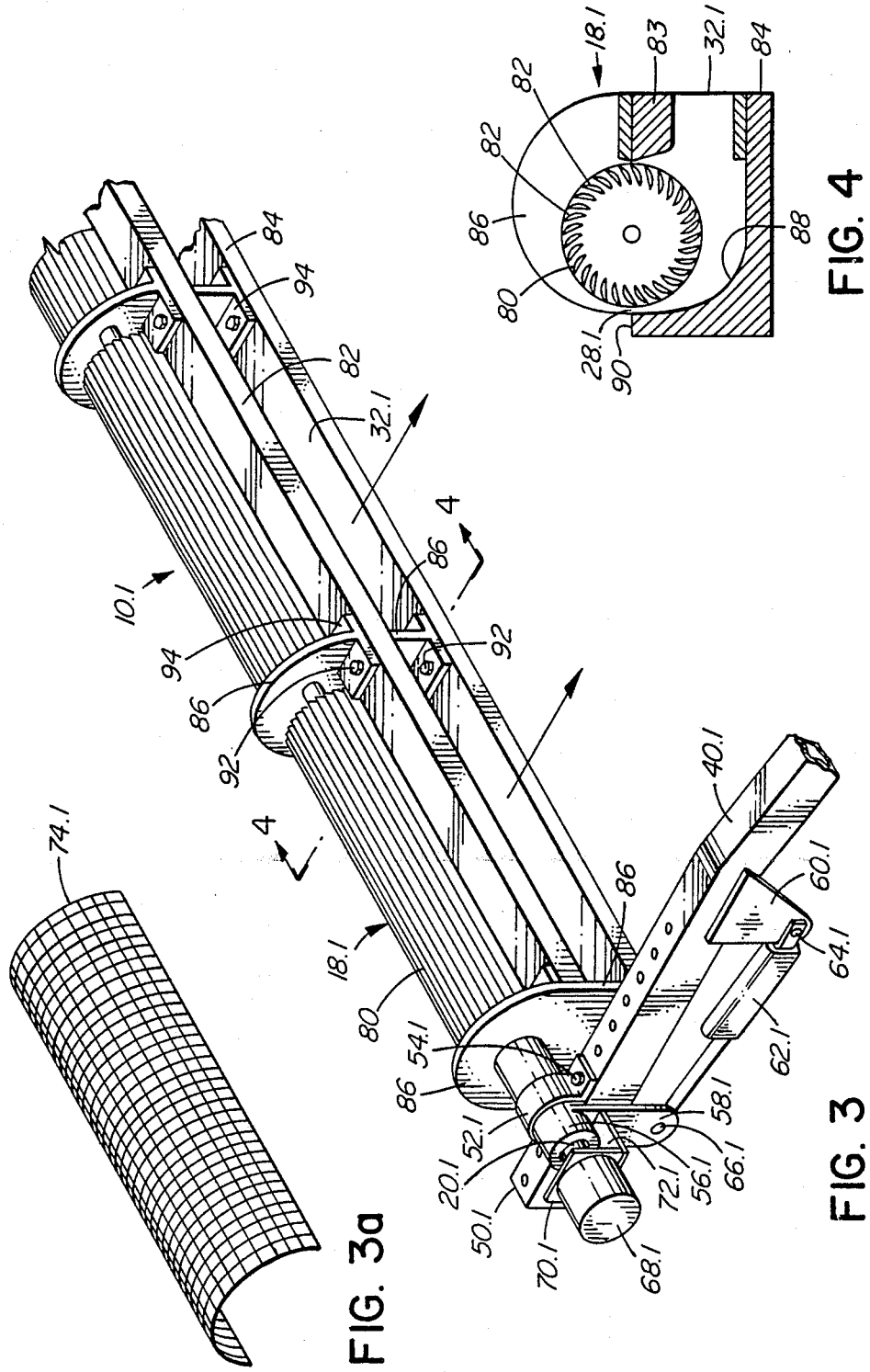

CROP BLOWER APPARATUS

FIELD OF THE INVENTION

The invention relates to crop blower apparatuses for crops towards crop harvesting machinery including cutting knives of combine harvesters.

BACKGROUND OF THE INVENTION

Apparatuses have been developed for directing crops towards harvesting machines using streams of air. One device of this type, commonly known as a pneumatic header attachment or air reel, generally includes a blower mounted on the rear or back side of a combine crop cutting header where it is near the power shaft. Such devices are conventionally driven by belts from the power shaft. Typically a flexible air tube takes air from the blower forward to a manifold which runs across and in front of the crop cutting knife. The manifold usually has numerous downspouts which deliver air through nozzles at high speed to direct the crop back into the cutter and then into the auger conveyer. Considerable power is necessary to provide the volume and pressure of air required to accomplish this.

Some crops or crop conditions require much higher forces than are conventionally obtainable from such apparatuses. Two separate blowers have been used in the past, one at each end of the table. However, these apparatuses are expensive, very power consuming and increase the force applied to the crops by only about 35%.

It would be desirable to provide a device which would significantly increase the net force applied to such crops without consuming a great deal of power.

SUMMARY OF THE INVENTION

The invention provides a crop blower apparatus including a blower for providing a stream of forced air. There is means for powering the blower and discharge means connected to the blower for providing a curtain of air. There is means for mounting said blower, said means for powering and said discharge means forwardly of the crop receiving portion of a harvester.

The apparatus may include a plurality of blowers, the discharge means including discharge ducts for the blowers. The discharge ducts may be juxtaposed so the means for directing can discharge a substantially continuous curtain of air.

In a preferred form, the discharge ducts are aligned along an axis, each of the ducts being relatively elongated along the axis and relatively narrow perpendicular to the axis.

The blowers may be rotary blowers, each having a drive shaft, the shafts being axially aligned and interconnected.

The apparatus may be provided in combination with a combine harvester, the crop receiving portion being a crop cutting knife of the harvester.

Compared with conventional pneumatic header attachments, the invention permits a significantly increased force to be applied to the crops. This is accomplished by using a much larger volume of air, for example ten times the volume used in conventional pneumatic header attachments but having much lower pressure. The force of the air stream at the combine cutter bar has been measured at two to three times that achieved with previous devices. At the same time, power consumption is less than half that of conventional pneumatic header attachments. This permits the use of the standard belt or hydraulic drive systems that are now used to power the conventional bat-type reel. Therefore, the cost of the apparatus is significantly reduced.

BRIEF DESCRIPTION OF THE DRAWINGS

In the drawings:

FIG. 1a is an isometric view of a screen for one of the blowers of the apparatus of FIG. 1;

FIG. 3 is enlarged isometric view similar to FIG. 2 and showing an apparatus according to an alternative embodiment of the invention;

FIG. 3a is an isometric view of a screen for the apparatus of FIG. 3;

FIG. 4 is a sectional view taken along line 4—4 of FIG. 3;

DESCRIPTION OF THE PREFERRED EMBODIMENTS

Figure 1:
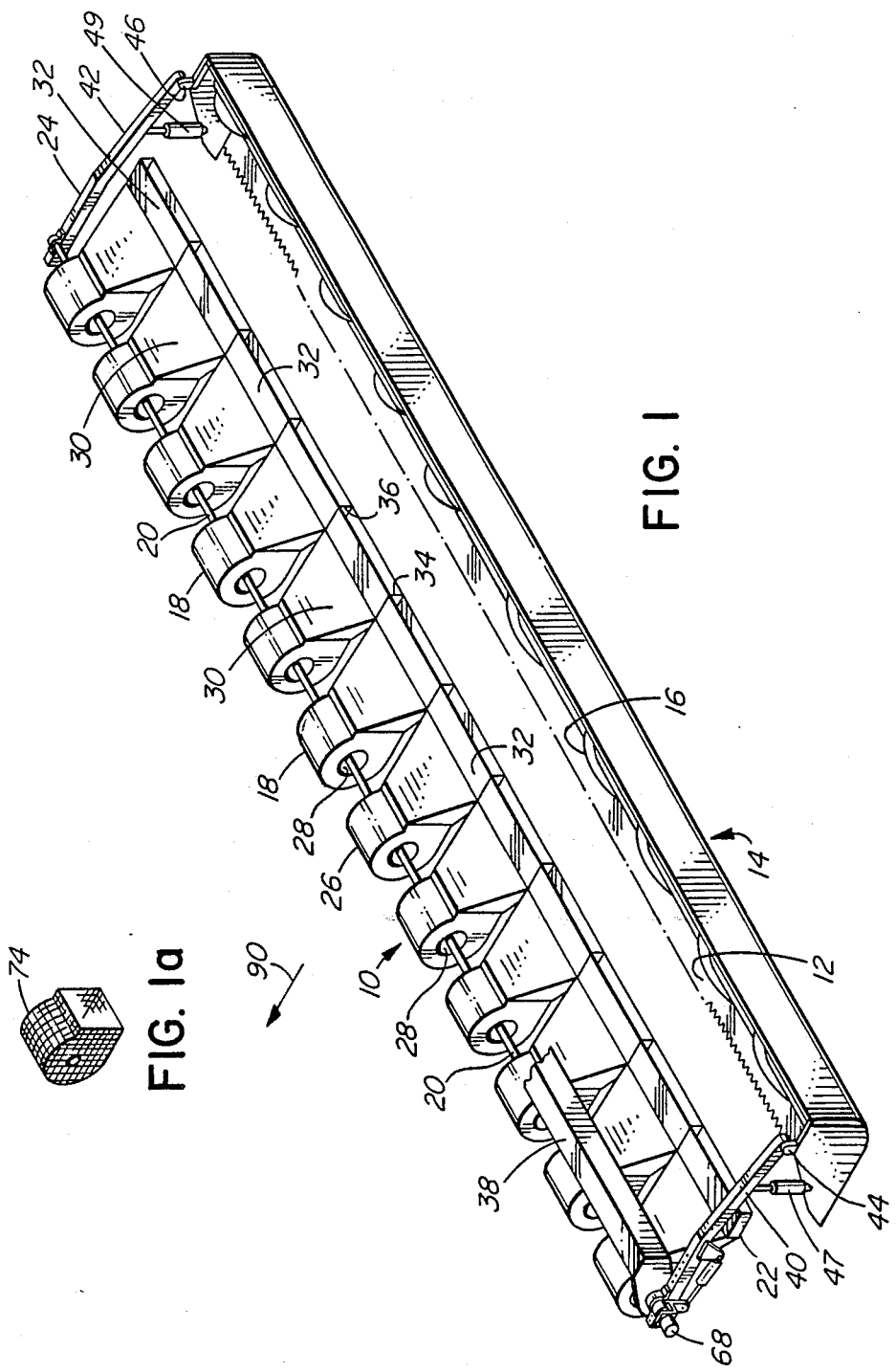
FIG. 1 is a simplified isometric view of a blower apparatus, according to an embodiment of the invention, shown connected to a fragment of a combine harvester.

Referring firstly to FIG. 1, this shows a blower apparatus 10 for directing a crop towards a crop receiving portion of a crop harvester, in this case towards cutting knife 12 of a combine harvester 14, shown in fragment and having a feed auger 16.

The apparatus includes a plurality of blowers 18 for providing a stream of forced air towards knife 12. In this example there are twelve centrifugal blowers employed. Each blower has a drive shaft 20, the shafts being interconnected in a coaxial manner so as to extend continuously from a first end 22 to a second end 24 of the apparatus. Each blower has a conventional internal fan, not shown for this embodiment. Each blower has a shroud 26 with an intake opening 28 on each side, only one of which is visible for each blower in FIG. 1. Each shroud is connected to a discharge duct 30 having a nozzle 32 at the end of the duct opposite shroud 26. As may be seen, the discharge ducts taper vertically towards the nozzles and the nozzles are relatively elongated in the direction defined by the axis of the drive shafts 20. The nozzles are relatively narrow in the vertical dimension which is perpendicular to the axis. The nozzles 32 are juxtaposed and, in this embodiment, are in contact with each other to form a substantially continuous discharge opening for air extending from end 22 to end 24 of the apparatus. The nozzles have end walls 34 and 36 which are thin and occupy a relatively small fraction of the distance between the ends so that the blowers supply a substantially continuous curtain of air from the nozzles.

Each of the blowers is connected by metal plate support hangers at each side of the shroud to a structural member 38, shown in fragment in FIG. 1, which extends between mounting arms 40 and 42 located at the ends 22 and 24 of the apparatus. The arms are part of the harvester and are connected to the harvester at 44 and 46. The arms are supported by fluid cylinders 47 and 49.

Figure 2:
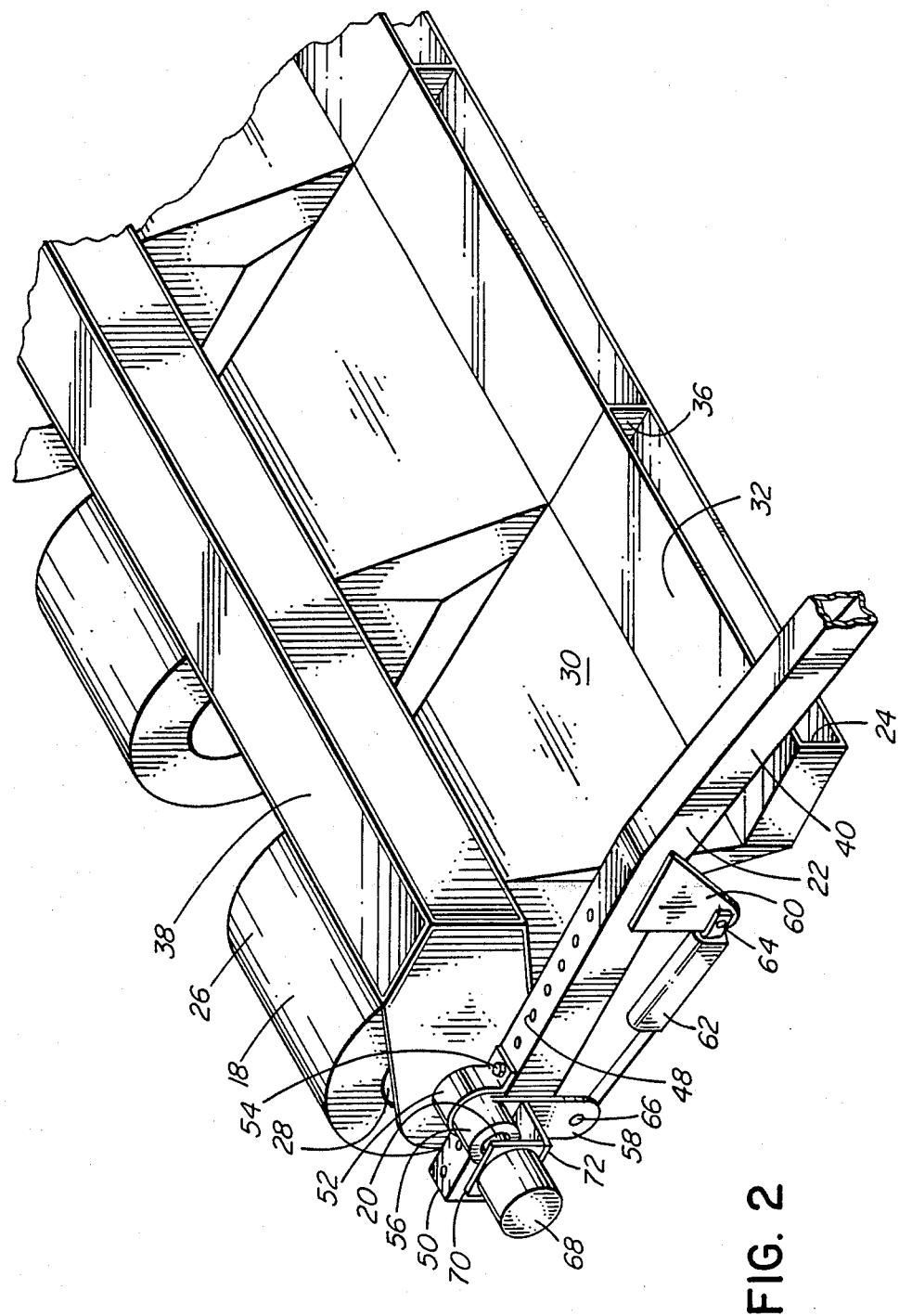
FIG. 2, is an enlarged, fragmentary view of one end of the apparatus of FIG. 1.

Referring to FIG. 2, which shows end 22 of the apparatus, each of the arms, arm 40 in this instance, is provided with a plurality of threaded apertures 48 on the top thereof near end 50 which is distal the combine harvester. A bearing cap 52 is connected by a pair of bolts 54, one of which is shown, to a selected two of these apertures. This is an example of one type of harvester only. In others, spring loaded pins are used instead of the bolts or hydraulic cylinders can be used to position the bearing. The bearing cap rotatably supports an annular member 56 connected to each end of structural member 38. A crank member 58 is connected to the annular member. An actuator mounting plate 60 is according to the invention connected to mounting arm 40. An electric actuator 62 is pivotally connected to plate 60 by a pin 64 and is pivotally connected to crank member 58 by a pin 66. Other actuators such as fluid cylinders could be substituted. Actuator 62, and the associated components just described, comprise means for holding member 36 against rotation and for adjustably rotating structural member 38, and thus blowers 18 which are connected to the structural member, about the axis through their drive shafts 20. In this manner, the angle of nozzles 32 can be adjusted about this axis. This allows the curtain of air from the blowers to be properly directed towards the cutting knife 12.

The end of drive shaft 20 of the blower 18 adjacent arm 40 is rotatably received by annular member 56 and is connected to means for powering the blower, in this case an hydraulic motor 68. The hydraulic motor is mounted on a mounting plate 70 connected to another plate 72 mounted on crank member 58. The motor 68 provides means for powering the blowers by rotating the interconnected drive shafts 20.

Each of the blowers may be provided with a screen 74 similar in shape to shroud 26. One of the screens is shown separately in FIG. 1a. A plurality of such screens would be employed, one for each blower. The screens prevent crops and other debris from entering the blowers.

Figure 5:
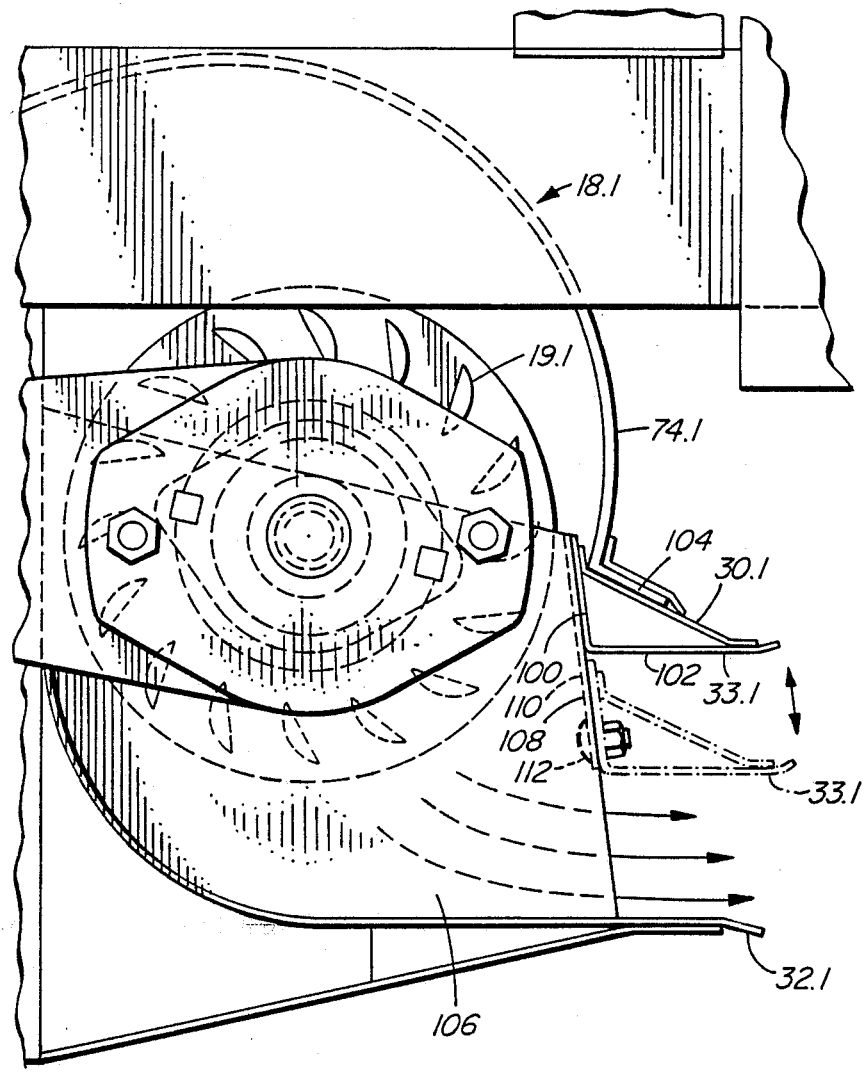
FIG. 5 is a sectional view of a blower of a further alternative embodiment of the invention having an adjustable outlet nozzle.

FIG. 5 shows an alternative type of blower 18.1 having a fan 19.1 and a screen 74.1. As in the blower described above, each shroud is connected to a discharge duct 30.1 with a nozzle 32.1. The nozzle is adjustable in size to regulate the current of air discharging from the fan. This is accomplished by adjustable top 33.1 which includes a vertical member 100, a horizontal member 102 and an inclined member 104 all of which extends across the width of the nozzle. The vertical member 100 extends slightly farther to each side and is connected at each end to one of the plurality of fixed bulkheads 106 between fan units. Each bulkhead has a flange 108 provided with a vertically elongated slotted opening 110. The vertical member is connected to each of the bulkheads by means of a bolt 112 extending through an aperture in the vertical member and in the elongated opening of the flange on the bulkhead. Thus, by loosening bolt 112, top 33.1 can be moved to positions between the top position shown in solid lines in FIG. 5 and the lower position in broken lines. The velocity of the air discharged from the fan can be increased and the current of air more concentrated by moving the top of the nozzle to a lower position. Alternatively, a flap pivotally mounted near the top of the nozzle or other means for reducing the area of the nozzle may be employed.

FIGS. 3, 3a, and 4 show an apparatus 10.1 according to an alternative embodiment of the invention. This apparatus is generally the same as apparatus 10 and therefore is described only with reference to the differences between the embodiments. Like parts have like numbers with the additional designation ".1" added thereto.

Whereas apparatus 10 of FIGS. 1, 1a, and 2 employs centrifugal blowers, the blowers 18.1 of apparatus 10.1 employ cross-flow fans 80. As best shown in the sectional view of FIG. 4, each fan has a plurality of elongated, parallel blades 82 arranged about the periphery thereof. Rotation of each fan draws air tangentially in through intake 28.1, the air is discharged through nozzle 32.1 of each blower. The blowers 18.1 may, in aggregate, be considered as a single blower extending from one end of apparatus 10.1 to the other.

The discharge nozzle 32.1 of each blower is formed at the top and bottom by a pair of spaced apart structural members 83 and 84. These members extend between mounting arm 40.1 and the similar arm at the opposite end of the apparatus (not shown). Thus they provide support for the blowers 18.1. The members 83 and 84 are interconnected by plates 86 at the end of each blower. The plates 86 also define the ends of each nozzle 32.1. The power shafts 20.1 of each blower are rotatably supported by an aperture in the plate 86 at each end of the blower. As may be seen in FIG. 4, each blower has a concave interior surface 88 which extends from the discharge nozzle upwardly to top end 90 adjacent intake 28.1 of each blower. The plates 86 are connected to the members 83 and 84 by means of bolts 92 and reinforcing plates 94.

Each of the blowers 18.1 may be provided with a screen 74.1 shown in FIG. 3a. This screen is semi-cylindrical in shape and fits over the top of each blower between a pair of the plates 86 to cover intake 28.1, as well as the exposed top half of each fan 80, and thus prevent crops and other debris from entering the air intake and interfering with the rotation of the fan.

Figure 6:
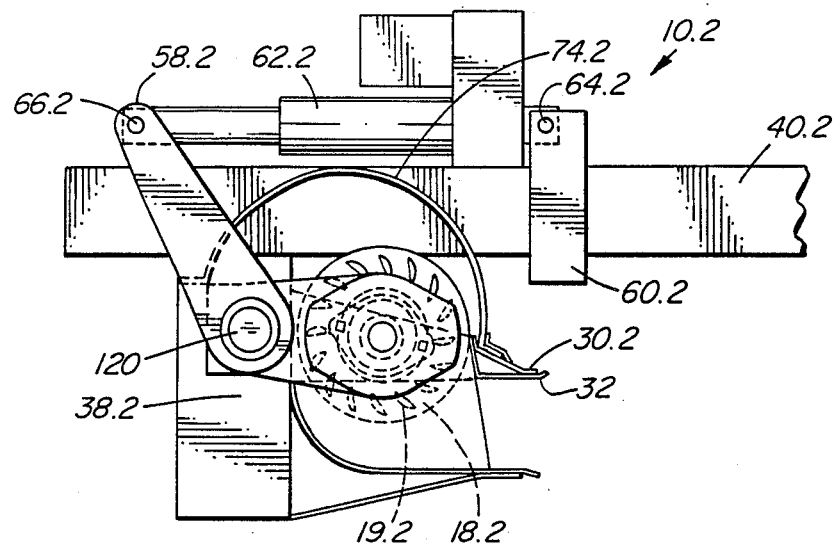
FIG. 6 is a fragmentary, side elevation of a blower apparatus according to a further alternative of the invention.
Figure 7:
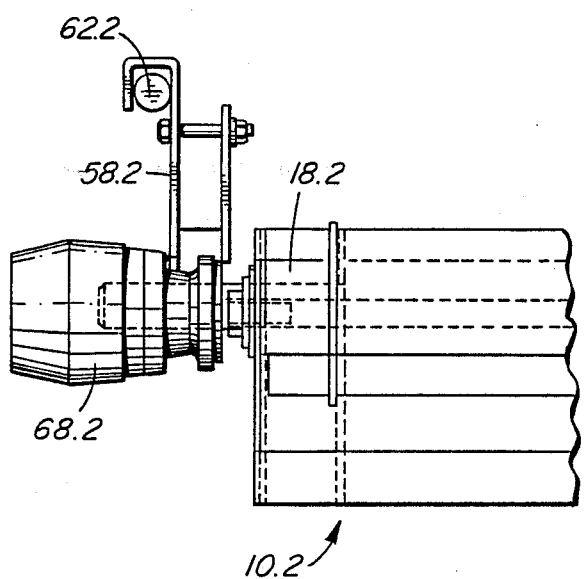
FIG. 7 is a fragmentary, rear elevation of the apparatus of FIG. 6.

FIGS. 6 and 7 show an apparatus 10.2 according to another embodiment of the invention. It is generally similar to the previous embodiments and equivalent parts have the same numbers with the additional designation ".2". In this variation, the blowers 18.2 are displaced relative to their pivot point 120 as best seen in FIG. 6.

OPERATION

Referring to FIG. 1, apparatus 10 is connected to a combine harvester 14 in the manner described above. Once this is done, the harvester is operated in the conventional manner moving forwardly, in the direction indicated by arrow 90, so that crops are cut by cutting knife 12 and then are fed into auger 16. The blowers are rotated by motor 68, shown best in FIG. 2, and the curtain of air discharged from the aligned nozzles 32 directs the crops towards the cutting knife. The blowers may be moved closer to or farther from the cutting knife by moving bearing caps 52 at each end to different apertures 48 on mounting arms 40 and 42. The angle of the curtain of air can be adjusted to properly direct the crops by use of hydraulic cylinder 62, shown in FIG. 2, to rotate the blowers and thus the nozzles about shafts 20.

The adjustable nozzle 32.1 of the variation in FIG. 5 permits the thickness of the air curtain and its velocity to be varied.

The apparatus provides a high volume of relatively low pressure air for directing the crop towards the cutting knife.

The embodiments of FIGS. 3, 3a, 4 and 5 operate substantially the same as apparatus 10 and thus will not be described separately.

It will be understood that many of the details described above are provided by way of example only. Variations are possible within the scope of the invention which is defined with reference to the following claims:

What is claimed is:

1. A crop blower apparatus comprising:
   a plurality of blowers for providing a stream of forced air;
   means for powering the blowers;
   discharge means connected to the blowers for providing a direct current of air, the discharge means including discharge ducts of the blowers, said ducts being juxtaposed to provide a substantially continuous curtain of air, the discharge ducts being aligned along an axis, each of the ducts being relatively elongated along the axis and relatively narrow perpendicular to the axis;
   means for regulating the curtain of air comprising means for adjusting the heights of the discharge ducts;
   means for mounting said blower on a crop harvester, said means for powering and said discharge means being mounted forwardly of the crop receiving portion of the crop harvester so the curtain of air is directed towards a crop receiving portion thereof; and
   means for adjustably rotating the blowers about the axis to angularly adjust the curtain of air.

2. An apparatus as claimed in claim 1, wherein the blowers are rotary blowers, each having a drive shaft, the shafts being axially aligned and interconnected.

3. An apparatus as claimed in claim 1, wherein the ducts are in contact with each other.

4. An apparatus as claimed in claim 1, wherein the blowers are centrifugal blowers.

5. An apparatus as claimed in claim 1, wherein the blowers are tangential flow blowers having rotors rotatable about the axis, means for intaking the air tangentially with respect to the rotors and means for discharging the air tangentially with respect to the rotors.

6. An apparatus as claimed in claim 1, having opposite ends, the means for mounting including arms at each said end.

7. An apparatus as claimed in claim 1, further including means for moving the blowers towards or away from the harvester.

8. An apparatus as claimed in claim 1, having opposite ends, the means for discharging extending substantially continuously between the ends.

9. In combination:
   a combine harvester having a crop cutting knife;
   a crop blower apparatus for directing a crop towards the knife, the apparatus including a plurality of blowers, means for discharging including discharge ducts being juxtaposed so said means for directing can discharge a substantially continuous current of air, the discharge ducts being aligned along an axis, being relatively elongated along the axis and relatively narrow perpendicularly to the axis, means for powering the blowers;
   means for mounting said crop blower apparatus on the harvester forwardly of the knife; and
   means for adjustably rotating the means for discharging about the axis to angularly adjust the curtain of air.

10. A combination as claimed in claim 9, wherein the blowers are rotary blowers, each having a drive shaft, the shafts being axially aligned and interconnected.

11. A combination as claimed in claim 9, wherein the ducts are in contact with each other.

12. A combination as claimed in claim 9, wherein the blowers are centrifugal blowers.

13. A combination as claimed in claim 9, wherein the blowers are tangential flow blowers having rotors rotatable about the axis, means for intaking the air tangentially with respect to the rotors and means for discharging the air tangentially with respect to the rotors.

14. A combination as claimed in claim 9, wherein the apparatus has opposite ends, the means for mounting including arms at each said end, the arms being connected to the combine harvester and extending forwardly therefrom.

15. A combination as claimed in claim 9, further including means for moving the blowers towards or away from the combine harvester.

16. A combination as claimed in claim 9, wherein the crop blower apparatus has opposite ends, the means for discharging extending continuously between the ends.

17. A crop blower apparatus comprising:
   a plurality of blowers for providing a stream of forced air;
   means for powering the blowers;
   discharge means connected to the blowers for providing a direct current of air, the discharge means including discharge ducts of the blowers, said ducts being juxtaposed to provide a substantially continuous curtain of air, the discharge ducts being aligned along an axis, each of the ducts being relatively elongated along the axis and relatively narrow perpendicular to the axis;
   means for regulating the curtain of air comprising means for adjusting the heights of the discharge ducts;
   means for regulating the curtain of air comprising means for adjusting the cross-sectional area of the discharge ducts;
   means for adjustably rotating the blowers about the axis to angularly adjust the curtain of air.

18. A crop blower apparatus as claimed in claim 17, wherein the means for regulating includes means for adjusting the heights of the discharge ducts.

19. A crop blower apparatus as claimed in claim 17 wherein the driveshafts of said blowers are interconnected in a co-axial manner so as to extend continuously from a first end of said blower to a second end thereof.

20. An apparatus as claimed in claim 17, wherein the blowers are tangential flow blowers having rotors rotatable about the axis, means for intaking the air tangentially with respect to the rotors and means for discharging the air tangentially with respect to the rotors, said means for intaking the air being located above said rotors.

* * * * *